(12) United States Patent
Zeng et al.

(10) Patent No.: US 12,248,503 B2
(45) Date of Patent: Mar. 11, 2025

(54) SYSTEMS AND METHODS FOR CLOUD CONTENT-BASED DOCUMENT CLUSTERING AND CLASSIFICATION INTEGRATION

(71) Applicant: Iron Mountain Incorporated, Boston, MA (US)

(72) Inventors: Zhihong Zeng, Acton, MA (US); Anwar Chaudhry, Mississauga (CA); Rajesh Chandrasekhar, Franklin, TN (US); Adam Darius Williams, Harleysville, PA (US); Utpal N. Gandhi, Wilmington, MA (US)

(73) Assignee: Iron Mountain Incorporated, Boston, MA (US)

( * ) Notice: Subject to any disclaimer, the term of this patent is extended or adjusted under 35 U.S.C. 154(b) by 539 days.

(21) Appl. No.: 16/887,751

(22) Filed: May 29, 2020

(65) Prior Publication Data

US 2020/0380254 A1   Dec. 3, 2020

Related U.S. Application Data

(60) Provisional application No. 62/854,230, filed on May 29, 2019.

(51) Int. Cl.
*G06F 16/35* (2019.01)
*G06F 16/355* (2025.01)
(Continued)

(52) U.S. Cl.
CPC .......... *G06F 16/355* (2019.01); *G06V 10/763* (2022.01); *G06V 10/82* (2022.01);
(Continued)

(58) Field of Classification Search
CPC .. G06V 30/413; G06V 30/416; G06V 10/763; G06V 10/82; G06V 30/19127;
(Continued)

(56) References Cited

U.S. PATENT DOCUMENTS 8,255,405 B2   8/2012   Basu et al.
8,276,067 B2   9/2012   Rujan et al.
(Continued)

FOREIGN PATENT DOCUMENTS

KR   20120058417   6/2012
WO   2017100072   6/2017

OTHER PUBLICATIONS

International Application No. PCT/US2020/035266, International Search Report and Written Opinion mailed on Sep. 11, 2020, 11 pages.
(Continued)

*Primary Examiner* — Amy Ng
*Assistant Examiner* — Yohanes D Kelemework
(74) *Attorney, Agent, or Firm* — Kilpatrick Townsend & Stockton LLP (57) ABSTRACT

A computer-implemented method, includes accessing, by a processor, a set of asset documents. The method also includes performing, by the processor, feature extraction on text of each document of the set of asset documents using a feature extraction module to generate a set of features, where each feature of the set of features represents a document of the set of asset documents. The method also includes generating, by the processor, a set of lower-dimensional features from the set of features using a singular value decomposition module. The method also includes generating, by the processor, a set of clusters from the set of lower-dimensional features using a clustering module. The method also includes training, by the processor, a machine-learning
(Continued)

model of a classification microservice using the set of clusters generated from the clustering module.

15 Claims, 8 Drawing Sheets

(51) Int. Cl.
*G06V 10/762* (2022.01)
*G06V 10/82* (2022.01)
*G06V 30/10* (2022.01)
*G06V 30/19* (2022.01)
*G06V 30/40* (2022.01)
*G06V 30/413* (2022.01)
*G06V 30/416* (2022.01)

(52) U.S. Cl.
CPC ........ *G06V 30/19127* (2022.01); *G06V 30/40* (2022.01); *G06V 30/413* (2022.01); *G06V 30/416* (2022.01); *G06V 30/10* (2022.01)

(58) Field of Classification Search
CPC ...... G06V 30/10; G06V 30/40; G06F 16/355; G06K 9/6221; G06N 20/00
See application file for complete search history.

(56) References Cited

U.S. PATENT DOCUMENTS

| | | | |
|---|---|---|---|
| 9,336,302 B1* | 5/2016 | Swamy | G06F 16/248 |
| 9,836,183 B1* | 12/2017 | Love | G06F 16/904 |
| 10,769,503 B1* | 9/2020 | Buhler | G06F 16/56 |
| 2005/0234952 A1* | 10/2005 | Zeng | G06F 16/951 |
| 2014/0156567 A1 | 6/2014 | Scholtes | |
| 2018/0349388 A1* | 12/2018 | Skiles | G06F 16/358 |
| 2019/0258640 A1* | 8/2019 | Clarkson | G06F 16/334 |
| 2019/0311301 A1* | 10/2019 | Pyati | G06F 16/901 |
| 2019/0354583 A1* | 11/2019 | Ralhan | G06F 16/13 |
| 2019/0354809 A1* | 11/2019 | Ralhan | G06F 16/116 |
| 2019/0377788 A1* | 12/2019 | Munro | G06F 40/30 |
| 2020/0344194 A1* | 10/2020 | Hosseinisianaki | G06N 3/084 |

OTHER PUBLICATIONS

PCT Application No. PCT/US2020/035266, International Preliminary Report on Patentability mailed on Dec. 9, 2021, 8 pages.

* cited by examiner

SYSTEMS AND METHODS FOR CLOUD CONTENT-BASED DOCUMENT CLUSTERING AND CLASSIFICATION INTEGRATION

CROSS REFERENCE TO RELATED APPLICATIONS

This application claims priority to U.S. Provisional Application No. 62/854,230 filed on May 29, 2019, titled "SYSTEMS AND METHODS FOR CLOUD CONTENT-BASED DOCUMENT CLUSTERING AND CLASSIFICATION INTEGRATION," the disclosure of which is hereby incorporated by reference in its entirety for all purposes.

TECHNICAL FIELD

The field of the present disclosure relates to document clustering and classification. More specifically, the present disclosure relates to using integrated techniques for implementing document clustering and classification.

BACKGROUND

When storing and grouping large quantities of valuable data assets, organizations may classify documents into groups of other like documents. Classification of documents may be a tedious process that involves manual review and organization of the documents. In other examples, classification of the documents may be performed on small sizes of documents using image features of the documents.

Existing classification systems, however, are often limited in scale and require significant manual effort. Further, because classification operations are often limited to smaller numbers of documents, the classifications based on image features may be performed on a local computing system. By performing the classification operations locally, local computing bandwidth may be exhausted or substantially limited. Moreover, automated classification relying on image features of documents may group documents together that look similar but include very different information.

SUMMARY

The terms "disclosure," "the disclosure," "this disclosure" and "the present disclosure" used in this patent are intended to refer broadly to all of the subject matter of this application and the claims below. Statements containing these terms should be understood not to limit the subject matter described herein or to limit the meaning or scope of the claims below. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain aspects of the present disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. An example includes a computer-implemented method, including accessing, by a processor, a set of asset documents. The method also includes performing, by the processor, feature extraction on text of each document of the set of asset documents using a feature extraction module to generate a set of features, where each feature of the set of features represents a document of the set of asset documents. The method also includes generating, by the processor, a set of lower-dimensional features from the set of features using a singular value decomposition module. The method also includes generating, by the processor, a set of clusters from the set of lower-dimensional features using a clustering module. The method also includes training, by the processor, a machine-learning model of a classification microservice using the set of clusters generated from the clustering module.

An additional example includes a computing system including one or more processors and one or more memory devices including instructions that are executable by the one or more processors for causing the one or more processors to perform operations. The operations include accessing a set of asset documents and performing feature extraction on text of each document of the set of asset documents using a feature extraction module to generate a set of features, where each feature of the set of features represents a document of the set of asset documents. The operations also include generating a set of lower-dimensional features from the set of features using a singular value decomposition module. The operations also include generating a set of clusters from the set of lower-dimensional features using a clustering module. The operations also include training a machine-learning model of a classification microservice using the set of clusters generated from the clustering module.

An additional includes a non-transitory computer-readable medium including computer-executable instructions to cause a computer to perform operations. The operations include accessing a set of asset documents and performing feature extraction on text of each document of the set of asset documents using a feature extraction module to generate a set of features, where each feature of the set of features represents a document of the set of asset documents. The operations also include generating a set of lower-dimensional features from the set of features using a singular value decomposition module. The operations also include generating a set of clusters from the set of lower-dimensional features using a clustering module. The operations also include training a machine-learning model of a classification microservice using the set of clusters generated from the clustering module.

BRIEF DESCRIPTION

The accompanying drawings, which are incorporated into and constitute a part of this specification, illustrate one or more certain examples and, together with the description of the example, serve to explain the principles and implementations of the certain examples.

DETAILED DESCRIPTION

The subject matter of embodiments of the present disclosure is described here with specificity to meet statutory requirements, but this description is not necessarily intended to limit the scope of the claims. The claimed subject matter may be implemented in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and examples of the disclosure relate to integrated techniques for implementing document clustering and classification. A computing platform may include one or more asset databases that store asset documents. The computing platform can access these asset documents and perform processing on the documents. In some examples, the processing can include optical character recognition, document feature extraction, singular value decomposition on the extracted document features, or any combination thereof.

For each document that is processed by the computing platform within a set of asset documents, a density-based spatial clustering operation may be performed. In one or more examples, the density-based spatial clustering operation may be performed as a microservice of a remote or cloud computing system, or the density-based spatial clustering operation may be performed locally as a module running on the computing platform.

Based on results of the density-based spatial clustering operation, such as assignment of documents to different clusters, a classification operation may be performed on the documents of the set of asset documents. The classification operation may identify a particular attribute of documents within a document cluster that may be useful for arranging the documents. In this manner, groups of documents from the set of asset documents may be classified as similar documents based on the content of the documents determined from the clustering operation.

Further, the classification of the similar documents may be used to train a machine-learning algorithm of a classification service. In this manner, additional documents added to the set of asset documents may be provided to the classification service to accurately classify the documents. In an example, the classification service may be performed as another microservice of the remote or cloud computing system, or the classification operation may be performed locally as an additional module running on the computing platform. Additional details regarding these and other aspects of the techniques presented herein will be provided below with regard to FIGS. 1-8.

By utilizing the techniques presented herein, groups of documents within a set of asset documents can be classified based on the content of the documents. The techniques described herein improve functionality of the set of asset documents by providing a mechanism that efficiently classifies types of documents based on the content within the document. Specifically, by performing feature clustering on each document of the set of document assets and classifying those documents based on the clustering results, the documents of the set of asset documents can be efficiently organized. Further, a document classification model, which may be built from clustering labels, may be used to predict a classification of future documents added to the set of asset documents. In this manner, the clustering operation and the classification operation are integrated such that a classification operation is built on results of the clustering operation.

Figure 1:
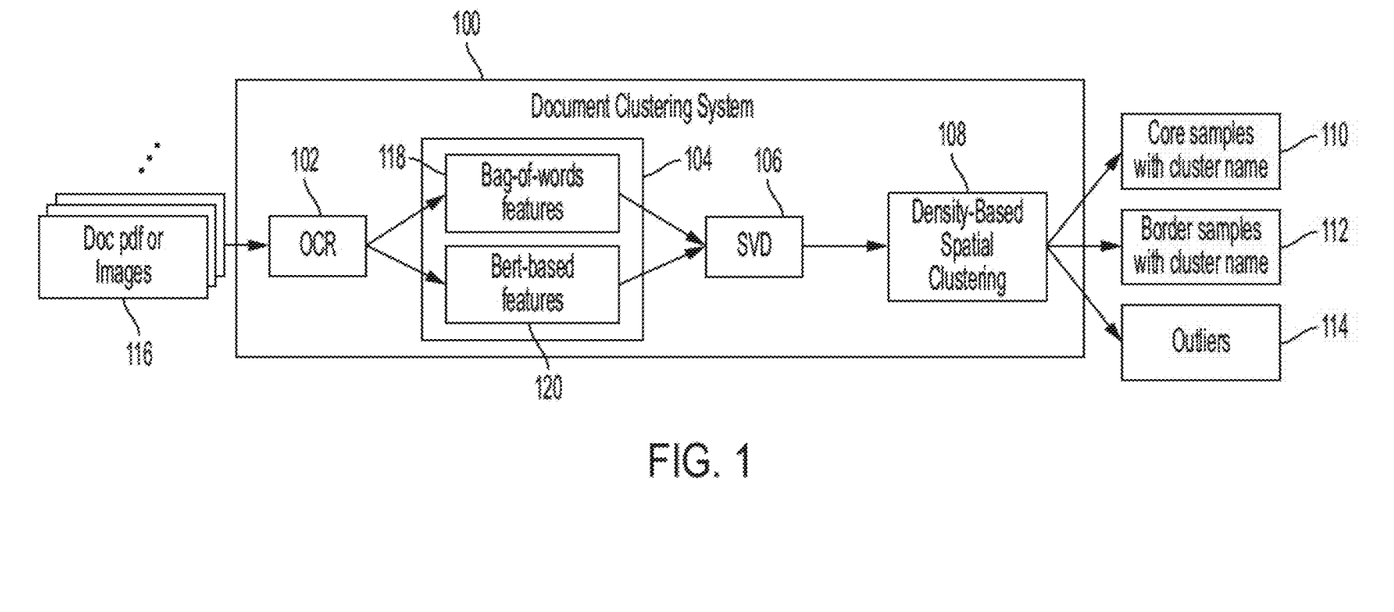
FIG. 1 shows a block diagram of a document clustering system, according to certain aspects of the present disclosure.

FIG. 1 shows a block diagram of a document clustering system 100, according to certain aspects of the present disclosure. As shown in FIG. 1, the document clustering system 100 includes an optical character recognition module 102, a feature extraction module 104, a singular value decomposition module 106, and a density-based spatial clustering module 108 for providing generating clustering outputs 110, 112, and 114 from a set of asset documents 116. For example, the optical character recognition module 102 may identify characters in the set of asset documents 116. In other words, the documents within the set of asset documents 116 are converted by the optical character recognition module 102 into machine-encoded text representations of the documents. In some examples, one or more documents of the set of asset documents 116 may already be in a machine-encoded state. Accordingly, the document clustering process may proceed without the optical character recognition operation of the optical character recognition module 102 on those documents. Other text recognition operations may also be used on the documents in place of the optical character recognition operation.

The machine-encoded text of the set of asset documents 116 is provided to the feature extraction module 104. The feature extraction module 104 converts each document from the set of asset documents 116 into a feature representation of the document. In an example, the feature extraction module 104 may use a bag-of-words feature extraction tool 118 or a bidirectional encoder representation of transformers (BERT) based feature extraction tool 120. In such an example, models of both the bag-of-words feature extraction tool 118 and the BERT-based feature extraction tool 120 can be pre-trained from one or more training corpuses of data. The output of the bag-of-words feature extraction tool 118 or the BERT-based feature extraction tool 120 is a high-dimensional feature representation of each document of the set of asset documents 116.

The feature extraction module 104 may be adjustable based on user preferences. For example, the BERT-based feature extraction tool 120 may provide a user with the ability to select a particular pre-trained model from a BERT-model hub. The user may select between a small and more computationally efficient base model or a larger and more precise model. Other model sizes may also be available for selection. A maximum sentence length of a document may also be selected for analysis by the BERT-based feature extraction tool 120, and a model layer of the BERT-based models may be selected (e.g., a last layer or a second to last layer) as a feature extraction point.

Further, a token or pooling strategy may be selected for an output of the BERT-based feature extraction tool 120. By selecting a token, the output of the BERT-based feature extraction tool 120 may be represented by an individual output token of the selected BERT-based model. The individual output token may include a feature representation of all of the context of the document analyzed by the BERT-based feature extraction tool 120. In the pooling strategy, a maximum token may be selected as the feature representation of the document, or a mean of all of the tokens output by the BERT-based model may be taken as the feature representation of the document.

The high-dimensional feature representations of the documents are provided to the singular value decomposition module 106. In an example, the singular value decomposition module 106 projects the high-dimensional features generated from the feature extraction module 104 to lower-dimensional features using a truncated singular value decomposition process. The high-dimensional features generated from the feature extraction module 104 may include hundreds of dimensions. After completion of the truncated singular value decomposition process, the hundreds of dimensions may be reduced to dozens or even single digits of dimensions representing the features of a document from the set of asset documents 116.

The lower-dimensional features that represent the documents of the set of asset documents are provided to the density-based spatial clustering module 108. The density-based spatial clustering module 108 performs a clustering operation on the low-dimensional features and assigns the each of the documents to a cluster. In an example, the output 110 of the density-based spatial clustering module 108 may be an indication that the document is part of a core sample of a particular cluster. The output 112 may be an indication that the document is a border sample of a particular cluster. For example, the low-dimensional features of the document may be within a boundary of the particular cluster but not located close to a core concentration of other documents within the particular cluster. Additionally, the output 114 may be an indication that the document is an outlier that does not fit within any of the designated clusters.

In one or more examples, each of the clusters may be tagged with a label that describes a commonality between the documents assigned to each of the clusters. Further, the documents and the associated labels may be used as training data to train a classification model. Additional documents that are added to the set of asset documents 116 after the clustering operation may be fed into a trained classification model to assign the additional documents to relevant classes or groups.

In an example, a grid search may be applied to the document clustering system 100 to find an optimal combination of adjustable parameters for clustering the documents of the set of asset documents 116. The goal of the grid search is to achieve a maximum average silhouette value within a defined range of cluster numbers. The silhouette value may represent how well documents are clustered with other similar documents. The silhouette value for the clusters may be calculated using a mean intra-cluster distance and a mean nearest-cluster distance for each sample.

The adjustable parameters may vary based on the feature extraction module 104. For example, the bag-of-words feature extraction tool 118 is adjustable by changing a maximum sentence length analyzed by the tool 118, changing a threshold number for a frequency of a word or phrase beyond which the word or phrase is ignored, changing a threshold number for a frequency or a word or phrase below which the word or phrase is ignored, and changing a maximum number of features sorted by frequency. In another example, the BERT-based feature extraction tool 120 is adjustable by changing which of the pre-trained BERT-models is used in the analysis of the set of asset documents 116, changing a maximum sentence length analyzed by the tool 120, changing a transformer layer used for the feature extraction, changing a number of tokens used for the feature extraction, changing a pooling strategy of the tokens (e.g., max or mean token values), or any combination thereof.

Other adjustable parameters of the document clustering system 100 may also be adjusted based on the grid search. For example, parameters of the singular value decomposition module 106 may be adjusted such that the reduced dimension-value feature representation that is output to the density-based spatial clustering module 108 is changed. Further, parameters of the density-based spatial clustering module 108 may also be adjusted. For example, a maximum distance between feature representations of two documents to be considered as neighbors within a cluster may be adjusted, and a number of samples in a neighborhood within a cluster for a point to be considered a core point may be adjusted. By adjusting all of these parameters, the document clustering system 100 may be optimized to achieve a maximum average silhouette value within a defined range of cluster numbers.

Figure 2:
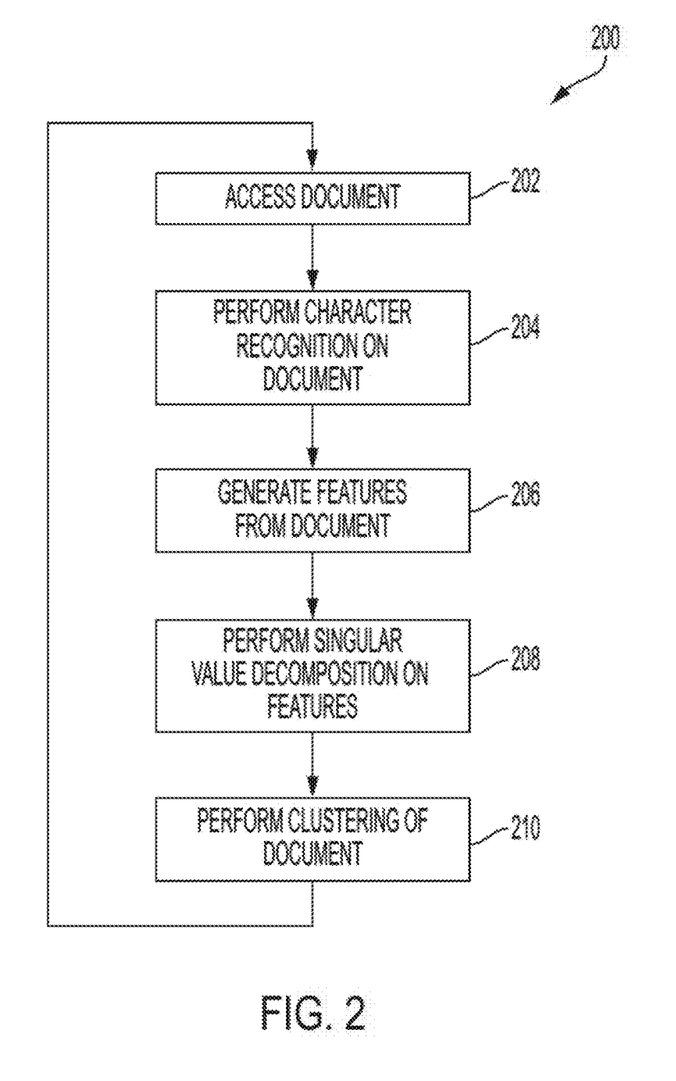
FIG. 2 shows a flowchart of a process for clustering documents using the document clustering system of FIG. 1, according to certain aspects of the present disclosure.

FIG. 2 shows a flowchart of a process 200 for clustering documents using the document clustering system 100, according to certain aspects of the present disclosure. At block 202, the process 200 involves accessing the set of asset documents 116. In an example, the set of asset documents 116 is stored in a manner that enables access to the set of asset documents 116 is by the document clustering system 100. The set of asset documents 116 may be stored locally with the document clustering system 100, or the document clustering system 100 may access the set of asset documents 116 from a remote storage system.

At block 204, the process 200 involves performing character recognition on the set of asset documents 116. For example, the optical character recognition module 102 may identify characters in the set of asset documents 116 using an optical character recognition technique. In other words, the documents within the set of asset documents 116 are converted by the optical character recognition module 102 into machine-encoded text representations of the documents.

At block 206, the process 200 involves generating or otherwise extracting features from the set of asset documents 116. For example, the machine-encoded text of the set of asset documents 116 may be provided to the feature extraction module 104. The feature extraction module 104 converts each document from the set of asset documents 116 into a feature representation of the document. In an example, the feature extraction module 104 may use a bag-of-words feature extraction tool 118 or a bidirectional encoder representation of transformers (BERT) based feature extraction tool 120. The output of the bag-of-words feature extraction tool 118 or the BERT-based feature extraction tool 120 may be a high-dimensional feature representation of each document of the set of asset documents 116.

At block 208, the process 200 involves performing singular value decomposition on the high-dimensional features generated at block 206. For example, the high-dimensional feature representations of the documents may be provided to the singular value decomposition module 106. In an example, the singular value decomposition module 106 may project the high-dimensional features generated from the feature extraction module 104 to lower-dimensional features using a truncated singular value decomposition process. In an example, the high-dimensional features generated from the feature extraction module 104 may include hundreds of dimensions. After completion of the truncated singular value decomposition process, the hundreds of dimensions may be reduced to dozens or even single digits of dimensions that represent the features of a document from the set of asset documents 116.

At block 210, the process 200 involves performing a clustering operation on the set of asset documents 116. In an example, the lower-dimensional features that represent the documents of the set of asset documents 116 are provided to the density-based spatial clustering module 108. The density-based spatial clustering module 108 performs a clustering operation on the low-dimensional features, and assigns the each of the documents to a cluster that is relevant to the features of the documents.

Figure 3:
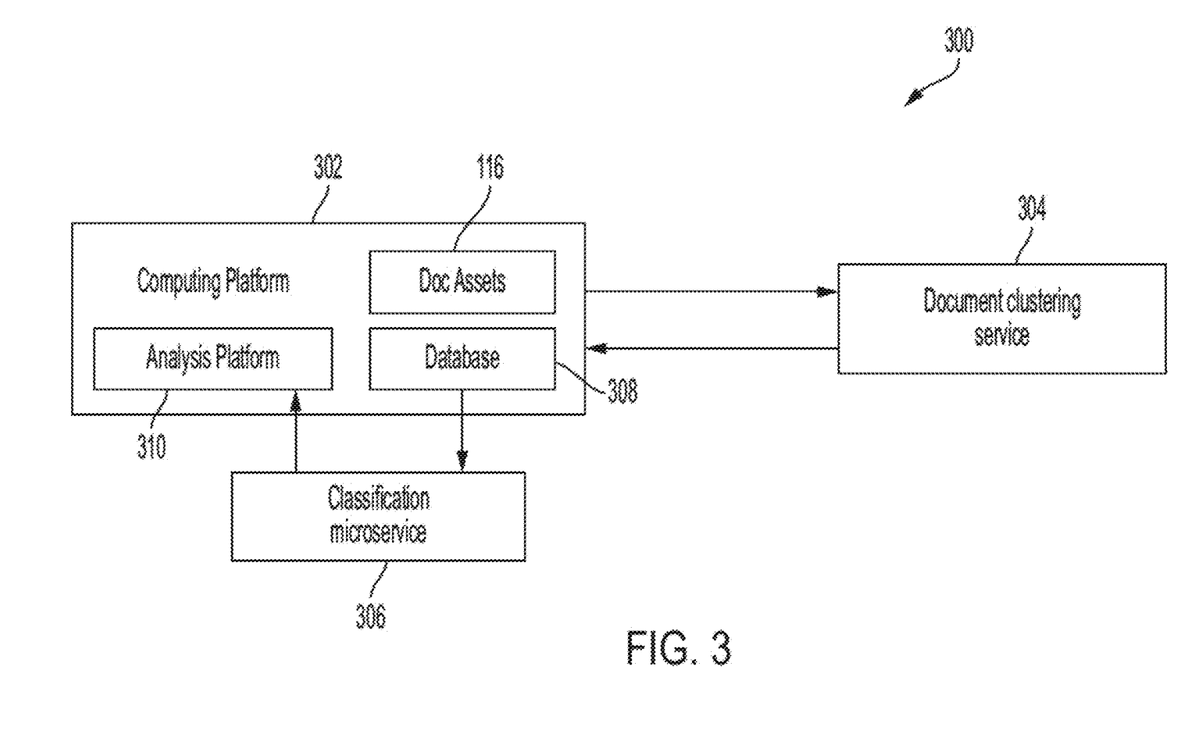
FIG. 3 shows a block diagram of a computing platform used for document clustering and document classification, according to certain aspects of the present disclosure.

FIG. 3 shows a block diagram of a computing environment 300 used for document clustering and document classification, according to certain aspects of the present disclosure. The computing environment 300 may include a computing platform 302. In an example, the computing platform 302 may run on a client computer, while a document clustering service 304 and a classification microservice 306 are run on remote computing devices, such as in a cloud computing system. In other examples, one or more of the document clustering service 304 and the classification microservice 306 may also be run locally on the client computer.

The computing platform 302 may provide access to the set of asset documents 116 by the document clustering service 304, which may include the document clustering system 100. Further, outputs of the document clustering service 304, such as the outputs 110, 112, and 114 of the document clustering system 100, may be stored in a database 308 of the computing platform. The document clustering service 304 may be a scalable Kubernetes-based clustering service including several microservices that are able to fetch the documents from the set of asset documents 116 and process the documents. For example, the microservices may include the optical character recognition module 102, the feature extraction module 104, the singular value decomposition module 106, and the density-based spatial clustering module 108. The document clustering service 304 may run the microservices of the document clustering system 100 and assign cluster classes to the clustered documents to generate the outputs 110, 112, and 114. The assigned cluster classes may be displayed, accessed, and searched within the computing platform 302.

The document clustering service 304 including the scalable Kubernetes-based clustering service with multiple microservices may be implemented as a cloud based implementation. In such an example, the system scalability provided by the cloud based implementation may be capable of handling large quantities of documents from the set of asset documents 116 without depleting computing resources of the computing platform 302. The Kubernetes-based clustering service may increase computing resource utilization through a scalable Kubernetes system that efficiently coordinates and allocates computing resources across multiple microservices, such as the microservices described above with respect to the document clustering system 100. Because the Kubernetes-based clustering service is able to dynamically allocate computing resources to fill a demand, the reduction in unused, but paid for, computing resources in a cloud computing system may increase the efficiency and cost of handling and clustering large volumes of documents from the set of asset documents 116.

Additionally, the clustering results (e.g., the outputs 110, 112, and 114 of the document clustering system 100) may be used to build a classification model in the classification microservice 306. The classification model may be a supervised machine-learning model. In such an example, the documents of the set of asset documents 116 and their associated clustering results may be used in a supervised manner to train the classification model. Once trained, the classification model may identify classes for future documents that are subsequently added to the set of asset documents 116. The classification model may be deployed by an analysis platform 310 of the computing platform 302, or the classification model may be deployed remotely within the classification microservice 306.

Figure 4:
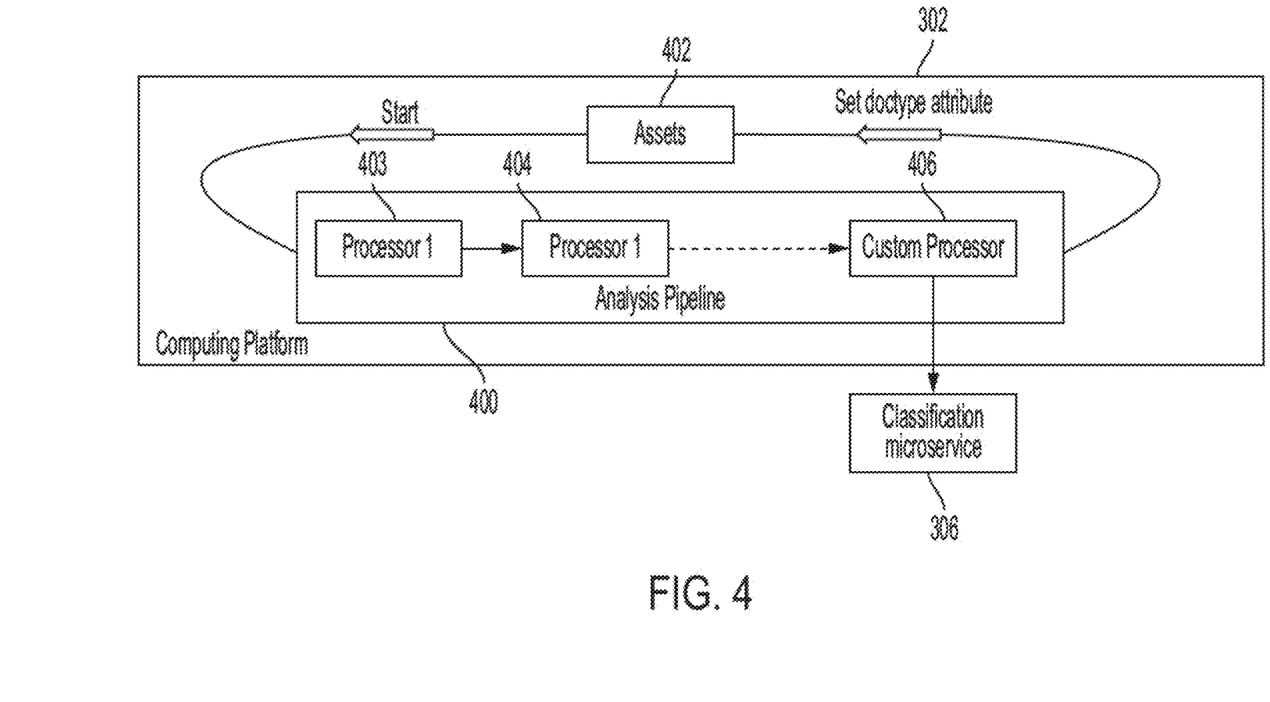
FIG. 4 shows a block diagram of an analysis pipeline of the computing platform of FIG. 3 used for document classification, according to certain aspects of the present disclosure.

FIG. 4 shows a block diagram of an analysis pipeline 400 of the computing platform 302 used for document classification, according to certain aspects of the present disclosure. An asset document 402 may be added to the set of asset documents 116. Upon receipt of the asset document 402 at the computing platform 302, the analysis pipeline 400 processes the asset document 402. In an example, the analysis pipeline 400 may include multiple processors 403 and 404 to process the asset document 402. For example, the processor 403 may perform an optical character recognition operation on the asset document 402, and the processor 404 may perform a feature extraction operation on the asset document 402. Other operations, such as a singular value decomposition, may be performed on the asset document 402 by one of the processors 403 or 404, or the other operations may be performed by an additional processor (not illustrated) of the analysis pipeline 400.

After processing the asset document 402, a custom processor 406 of the analysis pipeline 400 may request the classification microservice 306. As discussed above with respect to FIG. 3, the classification microservice 306 may include a classification model that is trained on labels that are assigned to documents of the set of asset documents 116 by the document clustering system 100. The classification model may receive processed information about features of the asset document 402. Based on the features of the asset document 402, the classification model may return a document class prediction to the custom processor 406. In an example, the custom processor 406 may assign a document class of the document class prediction to the asset document 402. The document class may be displayed, accessed, and searched by a user in the computing platform 302.

Figure 5:
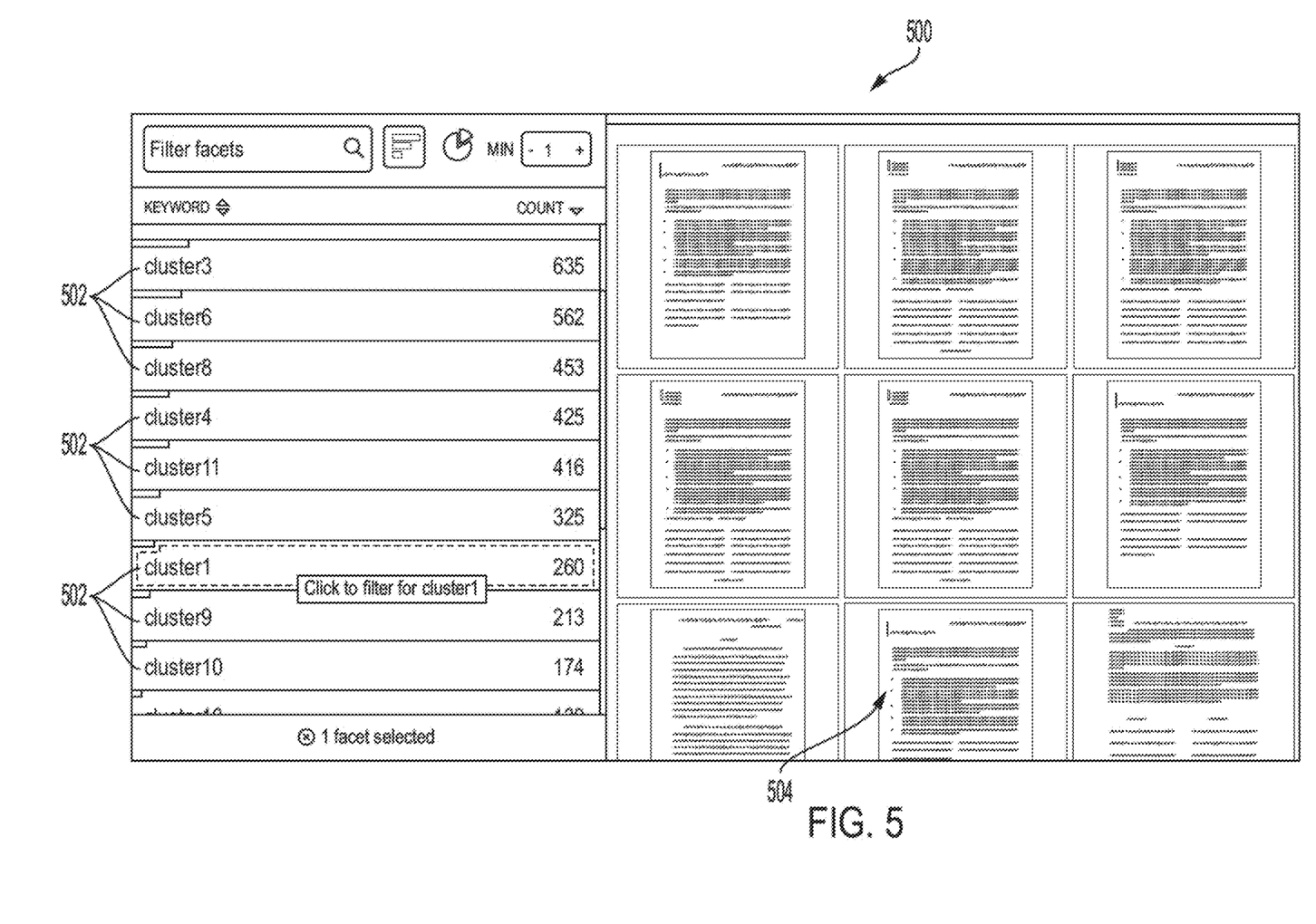
FIG. 5 is an example of an output of the document clustering system of FIG. 1, according to certain aspects of the present disclosure.

FIG. 5 is an example of an output 500 of the document clustering system 100, according to certain aspects of the present disclosure. In an example, the output 500 is a display of the computing platform 302. A set of clusters 502 represent a number of documents from the set of asset documents 116 that are within each cluster. A user may select a specific cluster to see a representation of the documents within the cluster.

For example, cluster 1 of the set of clusters 502 is selected in the illustrated output 500. Cluster 1 may represent a particular type of document 504 from the set of asset documents 116. Once cluster 1 is selected, a user may select from the documents 504 that were clustered into cluster 1 for further inspection.

Figure 6:
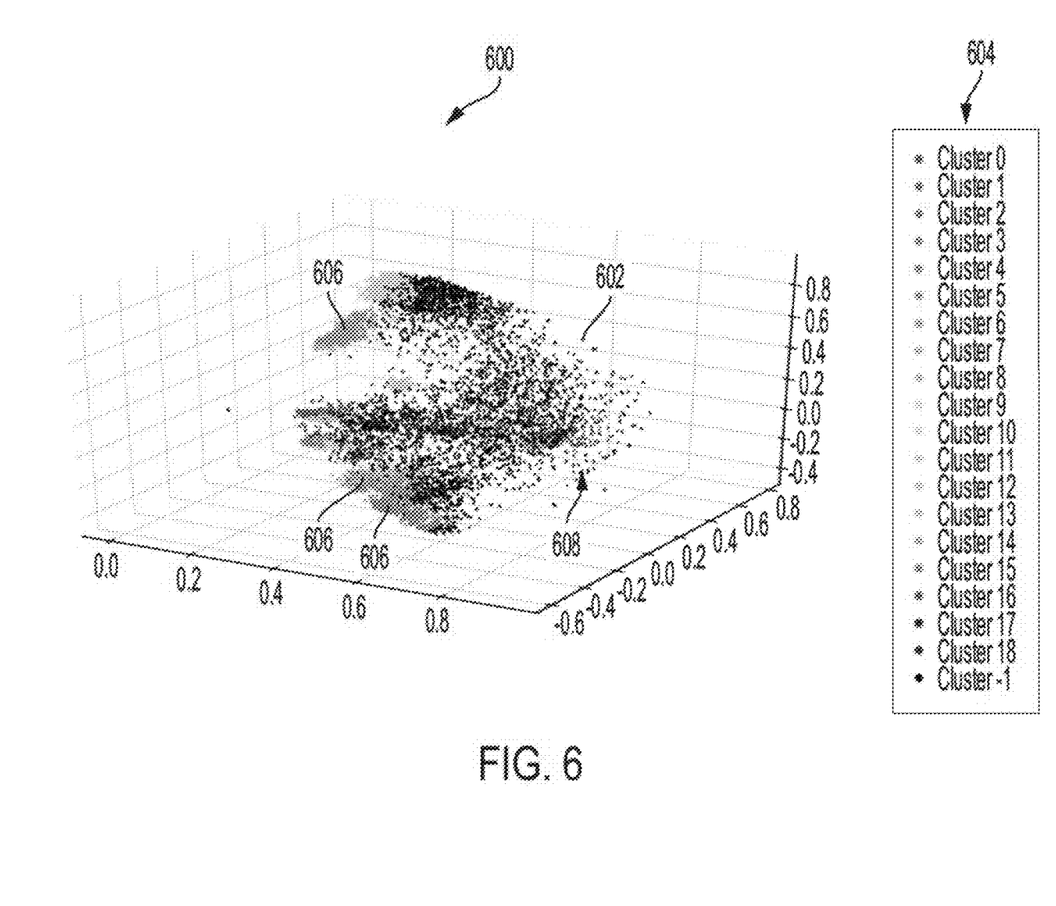
FIG. 6 shows an example of a three-dimensional representation of a document clustering output of the document clustering system, according to certain aspects of the present disclosure.

FIG. 6 shows an example of a three-dimensional representation 600 of a document clustering output of the document clustering system 100, according to certain aspects of the present disclosure. Each dot 602 within the three-dimensional representation 600 represents an individual document from the set of asset documents 116. A legend 604 provides an indication of a cluster 606 in which each of the documents from the set of asset documents 116 is assigned. In an example, each cluster 606 is represented by a different color in the three-dimensional representation 600. Further, the three-dimensional representation may provide an indication of the documents that are labeled as outliers 608 by the document clustering system 100. The documents labeled as the outliers 608 may be documents that are not sufficiently similar to other documents of the set of asset documents 116 to be included within one of the clusters 606.

Figure 7:
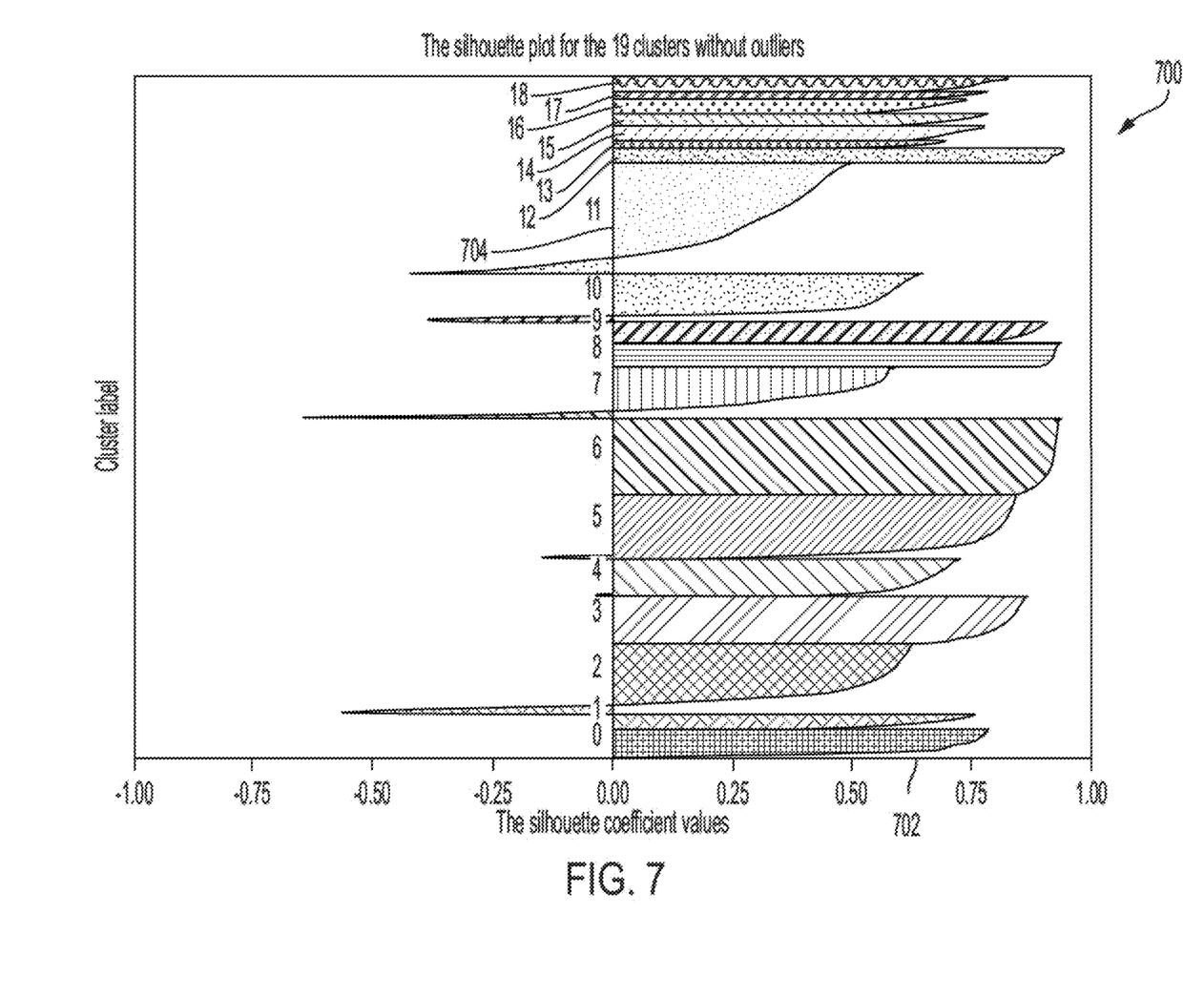
FIG. 7 shows an example of a silhouette plot of the document clustering output of FIG. 6, according to certain aspects of the present disclosure.

FIG. 7 shows an example of a silhouette plot 700 of the document clustering output of the document clustering system 100, according to certain aspects of the present disclosure. A silhouette coefficient, which is represented by the X-axis 702 of the silhouette plot 700, is a measure of how well samples of the documents are clustered with other similar documents. As shown, a best value for the silhouette coefficient is 1, and the worst value for the silhouette coefficient is −1. The Y-axis 704 represents the clusters 606 identified by the document clustering system 100. The clusters 606 with high silhouette coefficients are more dense. Accordingly, the documents within the clusters 606 with high silhouette coefficients have a greater similarity to each other, while the documents within the clusters 606 with lower silhouette coefficients may have less similarity to each other. As discussed above with respect to FIG. 1, parameters of the document clustering system 100 may be adjusted to maximize silhouette coefficients and ensure that documents are clustered with like documents.

Figure 8:
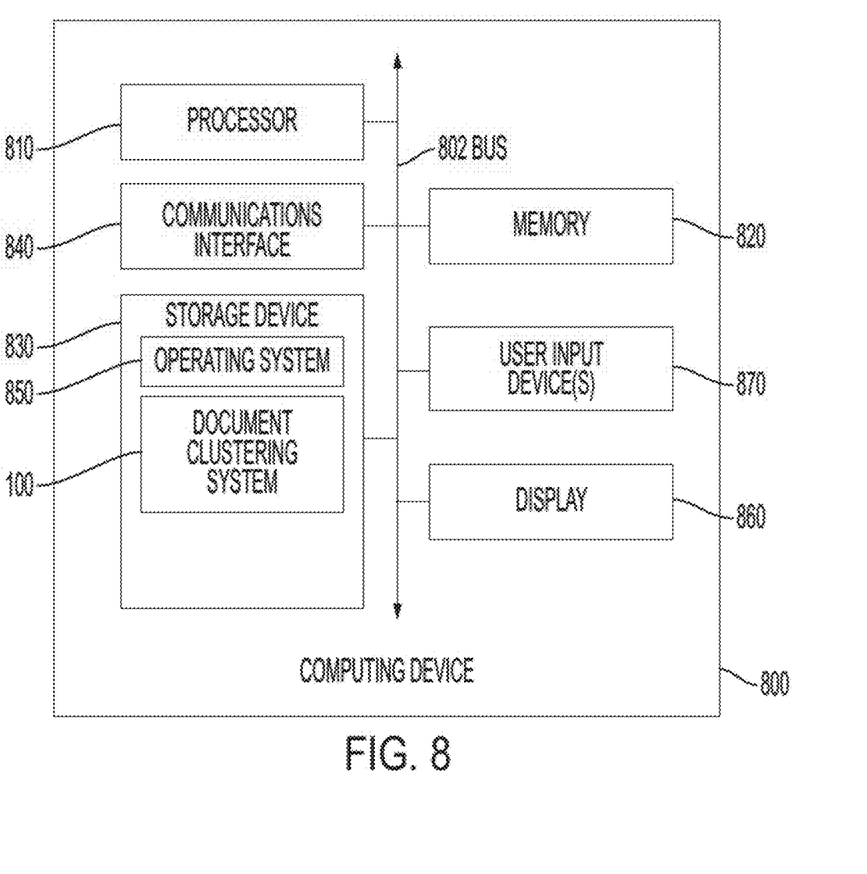
FIG. 8 shows an example computing device suitable for implementing aspects of the techniques and technologies presented herein.

FIG. 8 shows an example computing device suitable for implementing aspects of the techniques and technologies presented herein. The example computing device 800 includes a processor 810 which is in communication with a memory 820 and other components of the computing device 800 using one or more communications buses 802. The processor 810 is configured to execute processor-executable instructions stored in the memory 820 to perform secure data protection and recovery according to different examples, such as part or all of the example process 200 or other processes described above with respect to FIGS. 1-7. The computing device, in this example, also includes one or more user input devices 870, such as a keyboard, mouse, touchscreen, microphone, etc., to accept user input. The computing device 800 also includes a display 860 to provide visual output to a user.

The computing device 800 can also include or be connected to one or more storage devices 830 that provides non-volatile storage for the computing device 800. The storage devices 830 can store an operating system 850 utilized to control the operation of the computing device 800. The storage devices 830 can also store other system or application programs and data utilized by the computing device 800, such as modules implementing the functionalities provided by the document clustering system 100 or any other functionalities described above with respect to FIGS. 1-7. The storage devices 830 might also store other programs and data not specifically identified herein.

The computing device 800 can include a communications interface 840. In some examples, the communications interface 840 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate arrays (FPGAs) specifically, to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

In the following, further examples are described to facilitate the understanding of the subject matter of the present disclosure:

As used below, any reference to a series of examples is to be understood as a reference to each of those examples disjunctively (e.g., "Examples 1-4" is to be understood as "Examples 1, 2, 3, or 4").

Example 1 is a computer-implemented method, comprising: accessing, by a processor, a set of asset documents; performing, by the processor, feature extraction on text of each document of the set of asset documents using a feature extraction module to generate a set of features, wherein each feature of the set of features represents a document of the set of asset documents; generating, by the processor, a set of lower-dimensional features from the set of features using a singular value decomposition module; generating, by the processor, a set of clusters from the set of lower-dimensional features using a clustering module; and training, by the processor, a machine-learning model of a classification microservice using the set of clusters generated from the clustering module.

Example 2 is the computer-implemented method of example 1, wherein performing the feature extraction, generating the set of lower-dimensional features, generating the set of clusters, and training the machine-learning model are each performed by cloud-based microservices coordinated by a scalable Kubernetes system.

Example 3 is the computer-implemented method of examples 1-2, further comprising: accessing, by the processor, an additional document added to the set of asset documents; applying, by the processor, the additional document to the machine-learning model of the classification microservice; and assigning, by the processor, a document class to the additional document.

Example 4 is the computer-implemented method of examples 1-3, wherein the set of clusters represents a set of document classes, and wherein the classification microservice is configured to assign a document class of the set of document classes to additional documents added to the set of asset documents.

Example 5 is the computer-implemented method of examples 1-4, wherein the feature extraction module comprises a bidirectional encoder representation of transformers (BERT) based feature extraction tool or a bag-of-words feature extraction tool, and wherein the clustering module is configured to perform a density-based spatial clustering operation.

Example 6 is the computer-implemented method of example 5, wherein the density-based spatial clustering operation assigns each document of the set of asset documents as a core sample document within a cluster of the set of clusters, as a border sample document within the cluster of the set of clusters, or as an outlier document.

Example 7 is the computer-implemented method of examples 1-6, further comprising: performing, by the processor, a grid search to adjust adjustable parameters of the feature extraction module, the singular value decomposition module, the clustering module, or a combination thereof.

Example 8 is the computer-implemented method of examples 1-7, further comprising: generating, by the processor, a machine-encoded text representation of each document of the set of asset documents using an optical character recognition module, wherein the feature extraction is performed on the machine-encoded text representation of each document of the set of asset documents.

Example 9 is a computing system, comprising: one or more processors; and one or more memory devices including instructions that are executable by the one or more processors for causing the one or more processors to: access a set of asset documents; perform feature extraction on text of each document of the set of asset documents using a feature extraction module to generate a set of features, wherein each feature of the set of features represents a document of the set of asset documents; generate a set of lower-dimensional features from the set of features using a singular value decomposition module; generate a set of clusters from the set of lower-dimensional features using a clustering module; and train a machine-learning model of a classification microservice using the set of clusters generated from the clustering module.

Example 10 is the computing system of example 9, wherein the instructions are further executable by the one or more processors for causing the one or more processors to: access an additional document added to the set of asset documents; apply the additional document to the machine-learning model of the classification microservice; and assign a document class to the additional document.

Example 11 is the computing system of examples 9-10, wherein the set of clusters represent a set of document classes, and wherein the classification microservice is configured to assign a document class of the set of document classes to additional documents added to the set of asset documents.

Example 12 is the computing system of examples 9-11, wherein the instructions are further executable by the one or more processors for causing the one or more processors to: generate a machine-encoded text representation of each document of the set of asset documents using an optical character recognition module, wherein the feature extraction is performed on the machine-encoded text representation of each document of the set of asset documents.

Example 13 is the computing system of examples 9-12, wherein the feature extraction module comprises a bidirectional encoder representation of transformers (BERT) based feature extraction tool or a bag-of-words feature extraction tool.

Example 14 is the computing system of examples 9-13, wherein the clustering module is configured to perform a density-based spatial clustering operation.

Example 15 is the computing system of example 14, wherein the density-based spatial clustering operation assigns each document of the set of asset documents as a core sample document within a cluster of the set of clusters, as a border sample document within the cluster of the set of clusters, or as an outlier document.

Example 16 is a non-transitory computer-readable medium comprising computer-executable instructions to cause a computer to: access a set of asset documents; perform feature extraction on text of each document of the set of asset documents using a feature extraction module to generate a set of features, wherein each feature of the set of features represents a document of the set of asset documents; generate a set of lower-dimensional features from the set of features using a singular value decomposition module; generate a set of clusters from the set of lower-dimensional features using a clustering module; and train a machine-learning model of a classification microservice using the set of clusters generated from the clustering module.

Example 17 is the non-transitory computer-readable medium of example 16, comprising further computer-executable instructions to cause the computer to: access an additional document added to the set of asset documents; apply the additional document to the machine-learning model of the classification microservice; and assign a document class to the additional document.

Example 18 is the non-transitory computer-readable medium of examples 16-17, comprising further computer-executable instructions to cause the computer to: generate a machine-encoded text representation of each document of the set of asset documents using an optical character recognition module, wherein the feature extraction is performed on the machine-encoded text representation of each document of the set of asset documents.

Example 19 is the non-transitory computer-readable medium of examples 16-18, wherein the set of clusters represent a set of document classes, and wherein the classification microservice is configured to assign a document class of the set of document classes to additional documents added to the set of asset documents.

Example 20 is the non-transitory computer-readable medium of example(s) 16, comprising further computer-executable instructions to cause the computer to: perform a grid search to adjust adjustable parameters of the feature extraction module, the singular value decomposition module, the clustering module, or a combination thereof.

Different arrangements of the components depicted in the drawings or described above, as well as components and steps not shown or described are possible. Similarly, some features and sub-combinations are useful and may be employed without reference to other features and sub-combinations. Embodiments of the presently subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

What is claimed is:

1. A computer-implemented method, comprising:
   accessing, by a processor, a set of asset documents;
   receiving a feature extraction tool selection from a set of feature extraction tools stored within a feature extraction module, wherein the set of feature extraction tools stored within the feature extraction module comprises a bidirectional encoder representation of transformers (BERT) based feature extraction tool or a bag-of-words feature extraction tool;
   performing, by the processor, feature extraction on text of each document of the set of asset documents using the feature extraction tool to generate a set of features, wherein each feature of the set of features represents a document of the set of asset documents;
   providing, by the processor, the set of features to a singular value decomposition module;
   generating, by the processor, a set of lower-dimensional features from the set of features using the singular value decomposition module;
   generating, by the processor, a set of clusters representing document classes from the set of lower-dimensional features using a clustering module, wherein the clustering module is configured to perform a density based spatial clustering operation by assigning at least one document of the set of asset documents as a border sample document within the cluster of the set of clusters;
   performing, by the processor, a grid search to adjust adjustable parameters of the feature extraction module, the singular value decomposition module, the clustering module, or a combination thereof; and
   training, by the processor, a machine-learning model of a classification microservice using the set of clusters generated from the clustering module, wherein the classification microservice is configured to assign a document class of the set of document classes to additional documents added to the set of asset documents and further train the machine-learning model using results of clustering the additional documents.

2. The computer-implemented method of claim 1, wherein performing the feature extraction, generating the set of lower-dimensional features, generating the set of clusters, and training the machine-learning model are each performed by cloud-based microservices coordinated by a scalable Kubernetes system.

3. The computer-implemented method of claim 1, wherein the density based spatial clustering operation includes assigning one or more document of the set of asset documents as a core sample document within a cluster of the set of clusters or as an outlier document.

4. The computer-implemented method of claim 1, further comprising:
   generating, by the processor, a machine-encoded text representation of each document of the set of asset documents using an optical character recognition module, wherein the feature extraction is performed on the machine-encoded text representation of each document of the set of asset documents.

5. A computing system, comprising:
   one or more processors; and
   one or more memory devices including instructions that are executable by the one or more processors for causing the one or more processors to:
   access a set of asset documents;
   receive a feature extraction tool selection from a set of feature extraction tools stored within a feature extraction module, wherein the set of feature extraction tools stored within the feature extraction module comprises a bidirectional encoder representation of transformers (BERT) based feature extraction tool or a bag-of-words feature extraction tool;
   perform feature extraction on text of each document of the set of asset documents using the feature extraction tool selection to generate a set of features, wherein each feature of the set of features represents a document of the set of asset documents;
   provide, by the processor, the set of features to a singular value decomposition module;
   generate a set of lower-dimensional features from the set of features using the singular value decomposition module;
   generate a set of clusters representing document classes from the set of lower-dimensional features using a clustering module, wherein the clustering module is configured to perform a density based spatial clustering operation by assigning at least one document of the set of asset documents as a border sample document within the cluster of the set of clusters;

perform a grid search to adjust adjustable parameters of the feature extraction module, the singular value decomposition module, the clustering module, or a combination thereof; and train a machine-learning model of a classification microservice using the set of clusters generated from the clustering module, wherein the classification microservice is configured to assign a document class of the set of document classes to additional documents added to the set of asset documents and further train the machine-learning model using results of clustering the additional documents.

6. The computing system of claim 5, wherein the instructions are further executable by the one or more processors for causing the one or more processors to:

generate a machine-encoded text representation of each document of the set of asset documents using an optical character recognition module, wherein the feature extraction is performed on the machine-encoded text representation of each document of the set of asset documents.

7. The computing system of claim 5, wherein the density based spatial clustering operation includes assigning one or more document of the set of asset documents as a core sample document within a cluster of the set of clusters or as an outlier document.

8. A non-transitory computer-readable medium comprising computer-executable instructions to cause a computer to:

access a set of asset documents;

receive a feature extraction tool selection from a set of feature extraction tools stored within a feature extraction module, wherein the set of feature extraction tools stored within the feature extraction module comprises a bidirectional encoder representation of transformers (BERT) based feature extraction tool or a bag-of-words feature extraction tool;

perform feature extraction on text of each document of the set of asset documents using the feature extraction tool selection to generate a set of features, wherein each feature of the set of features represents a document of the set of asset documents;

provide the set of features to a singular value decomposition module;

generate a set of lower-dimensional features from the set of features using the singular value decomposition module;

generate a set of clusters representing document classes from the set of lower-dimensional features using a clustering module, wherein the clustering module is configured to perform a density based spatial clustering operation by assigning at least one document of the set of asset documents as a border sample document within the cluster of the set of clusters;

perform a grid search to adjust adjustable parameters of the feature extraction module, the singular value decomposition module, the clustering module, or a combination thereof; and train a machine-learning model of a classification microservice using the set of clusters generated from the clustering module, wherein the classification microservice is configured to assign a document class of the set of document classes to additional documents added to the set of asset documents and further train the machine-learning model using results of clustering the additional documents.

9. The non-transitory computer-readable medium of claim 8, comprising further computer-executable instructions to cause the computer to:

generate a machine-encoded text representation of each document of the set of asset documents using an optical character recognition module, wherein the feature extraction is performed on the machine-encoded text representation of each document of the set of asset documents.

10. The method of claim 1, further comprising:

generating, for each cluster in the set of clusters, a silhouette value, wherein the silhouette value is associated with a density of documents in each cluster;

determining an average silhouette value for the set of clusters; and adjusting one or more adjustable parameters of the feature extraction module, the singular value decomposition module, the clustering module, or a combination thereof to maximize the average silhouette value.

11. The method of claim 10, wherein the silhouette value is generated using a distance between lower-dimensional features of documents within a cluster of the set of clusters.

12. The computing system of claim 5, wherein the instructions are further executable by the one or more processors for causing the one or more processors to:

generate, for each cluster in the set of clusters, a silhouette value, wherein the silhouette value is associated with a density of documents in each cluster;

determine an average silhouette value for the set of clusters; and adjust one or more adjustable parameters of the feature extraction module, the singular value decomposition module, the clustering module, or a combination thereof to maximize the average silhouette value.

13. The computing system of claim 12, wherein the silhouette value is generated using a distance between lower-dimensional features of documents within a cluster of the set of clusters.

14. The non-transitory computer-readable medium of claim 8, comprising further computer-executable instructions to cause the computer to:

generate, for each cluster in the set of clusters, a silhouette value, wherein the silhouette value is associated with a density of documents in each cluster;

determine an average silhouette value for the set of clusters; and adjust one or more adjustable parameters of the feature extraction module, the singular value decomposition module, the clustering module, or a combination thereof to maximize the average silhouette value.

15. The non-transitory computer-readable medium of claim 14, wherein the silhouette value is generated using a distance between lower-dimensional features of documents within a cluster of the set of clusters.

* * * * *